P. F. DUNDON.
RESILIENT RIM.
APPLICATION FILED JUNE 11, 1913.
1,131,223.
Patented Mar. 9, 1915.
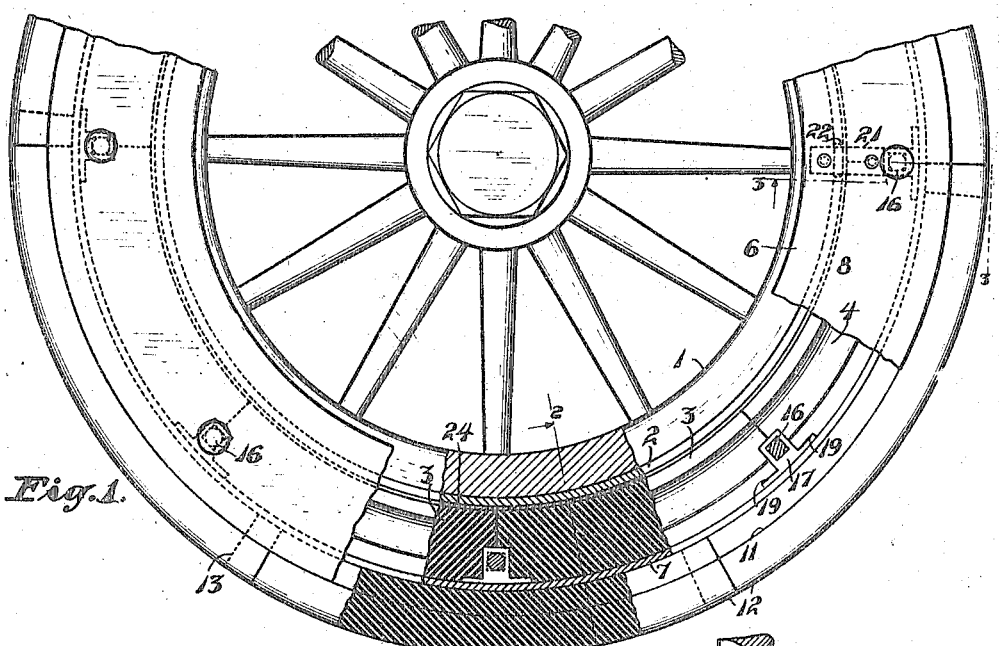
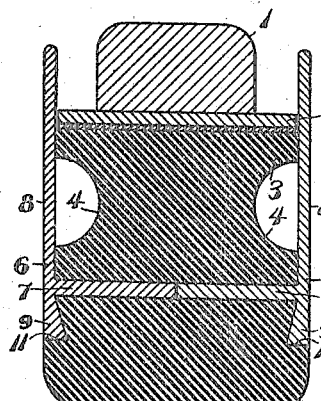
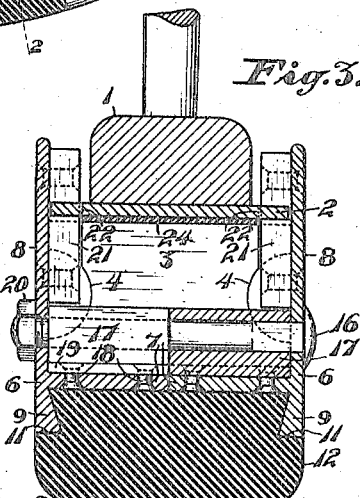
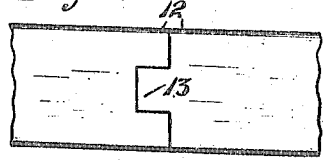
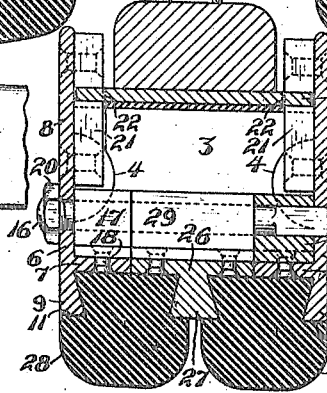
WITNESSES:
F. C. Fliedner
Genevieve Ball
INVENTOR,
Patrick F. Dundon,
BY Francis M. Wright,
ATTORNEYS.

UNITED STATES PATENT OFFICE.

PATRICK F. DUNDON, OF SAN FRANCISCO, CALIFORNIA.

RESILIENT RIM.

1,131,223.  Specification of Letters Patent.  Patented Mar. 9, 1915.

Application filed June 11, 1913. Serial No. 772,957.

*To all whom it may concern:*

Be it known that I, PATRICK F. DUNDON, a citizen of the United States, residing at San Francisco, in the county of San Francisco and State of California, have invented new and useful Improvements in Resilient Rims, of which the following is a specification.

The object of the present invention is to provide a resilient rim readily attachable to a wheel of ordinary construction, and the invention resides in the novel combination and arrangement of parts hereinafter specified and particularly set forth in the claims.

In the accompanying drawing, Figure 1 is a broken side elevation of a wheel of ordinary construction equipped with my improved rim; Figs. 2, 3 are cross sections on the lines 2—2, 3—3, respectively of Fig. 1; Fig. 4 is a view, similar to Fig. 3, of a modification; Fig. 5 is a broken plan view on a reduced scale of a rubber tread; Fig. 6 is a similar view of a wooden tread.

Referring to the drawing, 1 indicates the felly of a wheel, around which is shrunk, or otherwise secured, a flat steel tire 2, of greater width than the felly so as to extend beyond its edges. Surrounding said tire 2 are rubber cushions 3 in circular series, having inner surfaces fitting against the tire 2, and outer surfaces which are concentric with the inner surfaces and with the wheel, so that the cushions are of uniform thickness. Their sides are preferably concaved, as shown at 4, to give increased resiliency.

The cushions are inclosed by annular angle-irons or rings 6, one on each side of the wheel. Each ring comprises a cylindrical member 7, and a plane member 8 extending at right angles to the axis of the cylindrical member. The inner part of the plane member, within the cylindrical member 7 is of uniform thickness but the outer part 9, outside said cylindrical member, increases in thickness from said cylindrical member, its outer side, however, remaining coplanar with the outer side of the inner portion.

The outer thickened or flaring portions 9 of the plane members fit in correspondingly shaped grooves 11 in the inner portions of the sides of tread sections 12, which may be of rubber, wood, or any suitable material. Said tread sections are secured together either by means of a tongue 13 of one section fitting into a correspondingly shaped recess of an adjacent section, as shown in Fig. 5, which is the preferred construction when the sections 12 are made of rubber, or by means of a pin 14 fitting in registering rounded recesses 15 in adjacent ends of two sections, and secured to one of them, which is the preferred form when they are made of wood. The mediate portions of said plane members 8 of the rings fit snugly against the sides of the rubber cushions, while the cylindrical members 7 fit closely against the outer cylindrical surfaces of said cushions. After said rings have been placed in their positions surrounding the rubber cushions, and the inner edges of the cylindrical members fit closely against one another, they are then secured in such position by means of bolts 16 through the plane members 8 of the rings. An important feature of my invention resides in the specific construction by which I secure these angle-irons to one another.

For each bolt, I secure, to each cylindrical member 7 of the two rings 6 to be connected thereby, a spacer 17 by means of rivets 18 passed through a pair of lugs 19 extending from the outer side of each spacer on opposite sides thereof. When secured in place by said rivets, with their outer ends abutting against the inner surfaces of the plane members 8 of the rings, the inner ends of the spacers are in the plane of the inner edges of the cylindrical members 7 of said rings, so that, when said rings are secured together by said bolts, with the inner edges of the cylindrical members abutting against one another, as likewise the inner ends of the spacers, the plane members 8 of the rings then extend parallel with each other. Nuts 20 are secured on the threaded ends of the bolts passed through the spacers. When in this position, the portions 9 of the plane members engaging the grooves in the rim sections, firmly hold said rim sections in place.

To prevent slipping of the rings 6 around the tire 2, I provide a pair of keys 21 riveted to the inner sides of the plane members 8 of the rings, and which pass through a pair of recesses 22 formed in the edges of the tire 2 and prevent circumferential movement.

Since it is necessary for the elasticity of the rim that the plane members 8 of the rings should have complete freedom of movement past the edges of the tire 2, said plane members do not touch said tire. To exclude the entrance of dust through the joints of the rubber cushions, I provide an endless rubber band 24 completely encircling the tire 2.

In case it is desired to provide the wheel with a double tread, I provide a central ring 26, from the center of which extends outward a circular rib 27 flaring outwardly on both sides. Between the sides of this rib and the thickened portions 9 of the respective rings are secured the two treads 28 of the wheel. To said central ring 26 are riveted at suitable intervals central spacers 29.

It will be observed that my improved rim is readily detachable, it being only necessary to unscrew the nuts 20 and remove the bolts, whereupon all parts of the rim can be detached.

I claim:—

1. A resilient attachment for a non-resilient wheel comprising a tire adapted to be secured around the felly of the wheel, rubber cushions loosely surrounding the tire in circular series and contacting with each other at their ends, said cushions being of greater width than the tire, rings on opposite sides of the cushions, and extending inwardly past said tire, said rings having inwardly extending cylindrical members for retaining the cushions between the rings and having smooth inner surfaces, means for detachably securing said rings at a distance apart greater than the width of the tire, said cushions being recessed to receive said means, said tire and rings having parts loosely engaging each other to limit relative circumferential movement thereof.

2. A resilient attachment for a non-resilient wheel comprising a tire adapted to be secured around the felly of the wheel and extending beyond its edges and having marginal recesses, rubber cushions loosely surrounding the tire in circular series and contacting with each other at their ends, said cushions being of greater width than the tire, rings on opposite sides of the cushions, and extending inwardly past said tire, means for retaining the cushions between the rings, means for detachably securing said rings at a distance apart greater than the width of the tire, said cushions being recessed to receive said means, and keys, rigid with said rings and passing through said recesses.

3. A resilient attachment for a non-resilient wheel comprising a flat tire adapted to be secured around the felly of the wheel, and extending beyond its edges, and having marginal recesses, rubber cushions loosely surrounding the tire in circular series and contacting with each other at their ends, said cushions being of greater width than the tire, rings on opposite sides of the cushions, and extending inwardly past said tire, means for retaining the cushions between the rings, means detachably securing said rings at a distance apart greater than the width of the tire, said cushions being recessed to receive said means, an endless rubber band surrounding the tire, its edges contacting with the inner surfaces of said rings, and keys, rigid with said rings and passing through said recesses.

In testimony whereof I have hereunto set my hand in the presence of two subscribing witnesses.

PATRICK F. DUNDON.

Witnesses:
 FRANCIS M. WRIGHT,
 D. B. RICHARDS.